US012122435B2

(12) United States Patent
Guibene et al.

(10) Patent No.: US 12,122,435 B2
(45) Date of Patent: Oct. 22, 2024

(54) SYSTEM AND METHOD FOR REAL-TIME DETECTION OF TRAINS

(71) Applicant: Charter Communications Operating, LLC, St. Louis, MO (US)

(72) Inventors: Wael Guibene, Parker, CO (US); Islam Alyafawi, Bettendorf, IA (US); Hossam Hmimy, Aurora, CO (US); Mohamed Daoud, Englewood, CO (US); Hany Heikal, Aurora, CO (US); Allan D. Sjoestroem, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 935 days.

(21) Appl. No.: 17/165,152

(22) Filed: Feb. 2, 2021

(65) Prior Publication Data
US 2022/0242467 A1    Aug. 4, 2022

(51) Int. Cl.
*B61L 23/04*    (2006.01)
*B61L 1/14*    (2006.01)
(Continued)

(52) U.S. Cl.
CPC .............. *B61L 23/041* (2013.01); *B61L 1/14* (2013.01); *B61L 25/021* (2013.01);
(Continued)

(58) Field of Classification Search
CPC ...... B61L 27/10; B61L 23/041; B61L 25/021; B61L 25/025; B61L 27/57; B61L 27/70;
(Continued)

(56) References Cited

U.S. PATENT DOCUMENTS 5,893,043 A * 4/1999 Moehlenbrink .... B61L 15/0054
701/446
6,179,252 B1 * 1/2001 Roop ...................... B61L 29/18
246/122 R
(Continued)

OTHER PUBLICATIONS

Michael David Forsberg, "Video Detection of Trains", Civil Engineering Theses, Dissertations, and Student Research. (2012).

*Primary Examiner* — Zachary L Kuhfuss
(74) *Attorney, Agent, or Firm* — Young Basile Hanlon & MacFarlane, P.C.

(57) ABSTRACT

Methods and systems for real-time detection and reporting of trains is described. A system includes two train detection units (TDUs) for each railroad track intersecting a municipality boundary. Each TDU including a proximity sensor to sense a presence of an object on the railroad track, a camera to capture an image of a detected object when the object is within a detection zone, a radar to measure speed when the detected object is classified as a train, and a processor to classify the detected object, generate a timestamp corresponding to when the train entered and exited the detection zone, and determine a train length from the speed and time delta between entrance timestamp and exit timestamp. A train detection controller to receive at least the train length and a TDU identification from one of the two TDUs, and determine estimated time of arrivals for the train at different municipality locations.

20 Claims, 11 Drawing Sheets

(51) Int. Cl.
  *B61L 25/02*   (2006.01)
  *B61L 25/04*   (2006.01)
  *B61L 27/10*   (2022.01)
  *B61L 27/57*   (2022.01)
  *B61L 27/70*   (2022.01)
  *B61L 29/22*   (2006.01)

(52) U.S. Cl.
  CPC ........... *B61L 25/025* (2013.01); *B61L 25/046* (2013.01); *B61L 27/10* (2022.01); *B61L 27/57* (2022.01); *B61L 27/70* (2022.01); *B61L 29/228* (2013.01)

(58) Field of Classification Search
  CPC .. B61L 1/10; B61L 1/14; B61L 25/046; B61L 29/228; G01S 13/92
  See application file for complete search history.

(56) References Cited

U.S. PATENT DOCUMENTS

| | | | |
|---|---|---|---|
| 6,945,114 B2 | 9/2005 | Kenderian et al. | |
| 7,075,427 B1* | 7/2006 | Pace | B61L 23/06 |
| | | | 246/126 |
| 7,715,276 B2 | 5/2010 | Agam et al. | |
| 8,693,725 B2 | 4/2014 | Bobbitt et al. | |
| 8,985,523 B2 | 3/2015 | Chadwick et al. | |
| 9,919,723 B2* | 3/2018 | Bhagwatkar | B61L 27/53 |
| 2005/0205719 A1* | 9/2005 | Hendrickson | B61L 15/0081 |
| | | | 246/122 R |
| 2007/0040070 A1* | 2/2007 | Stevenson | B61L 29/30 |
| | | | 246/122 R |
| 2013/0256466 A1* | 10/2013 | Carlson | B61L 27/53 |
| | | | 246/218 |
| 2015/0148984 A1* | 5/2015 | Padulosi | B61L 25/028 |
| | | | 701/1 |
| 2015/0158513 A1* | 6/2015 | Costa | B64D 47/08 |
| | | | 348/144 |
| 2016/0039436 A1* | 2/2016 | Bhagwatkar | B61L 27/53 |
| | | | 348/148 |
| 2016/0068173 A1* | 3/2016 | Fuchs | G06Q 10/0833 |
| | | | 340/994 |
| 2016/0189552 A1* | 6/2016 | Hilleary | B61L 29/22 |
| | | | 246/125 |
| 2016/0200334 A1* | 7/2016 | Hilleary | B61L 23/041 |
| | | | 246/218 |
| 2017/0255824 A1* | 9/2017 | Miller | H04L 67/12 |
| 2017/0313332 A1* | 11/2017 | Paget | B61L 27/40 |
| 2017/0355388 A1* | 12/2017 | Schultz | B61L 29/04 |
| 2018/0170414 A1* | 6/2018 | Arndt | B64C 39/024 |
| 2019/0161103 A1* | 5/2019 | Venkatasubramanian | B61L 27/50 |
| 2019/0176862 A1* | 6/2019 | Kumar | B61L 27/40 |
| 2019/0287401 A1 | 9/2019 | Aoude et al. | |
| 2020/0070863 A1* | 3/2020 | Kumar | B61C 5/00 |
| 2022/0063689 A1* | 3/2022 | Kumar | H04W 4/40 |

* cited by examiner

SYSTEM AND METHOD FOR REAL-TIME DETECTION OF TRAINS

TECHNICAL FIELD

This disclosure relates to transportation safety and management. More specifically, this disclosure relates to real-time detection and reporting of trains.

BACKGROUND

Many municipalities have issues with trains passing through their region. These issues include blocked intersections, traffic delays, and other related inconveniences. This is especially true when the trains are long haul trains which can be ½ to 1 mile in length. The municipalities are not informed by the train operators of when the trains will be in their region or the length of the train. Consequently, the municipalities are unable to be proactive in traffic management.

SUMMARY

Disclosed herein are methods and systems for real-time detection and reporting of trains. In implementations, a train detection system includes at least two train detection units for each railroad track intersecting a municipality boundary. Each train detection unit including a proximity sensor configured to sense a presence of an object on the railroad track, a camera configured to capture an image of a detected object when the object is within a detection zone, a radar configured to measure speed when the detected object in the image is classified as a train, and a processor connected to the proximity sensor, the camera, and the radar. The processor configured to classify the detected object in the image, generate a timestamp corresponding to when the train entered the detection zone and when the train exited the detection zone, and determine a train length from the speed and time delta between entrance timestamp and exit timestamp. A train detection controller configured to receive at least the train length and a train detection unit identification from one of the at least two train detection units, and determine estimated time of arrivals for the train at different locations in a municipality.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
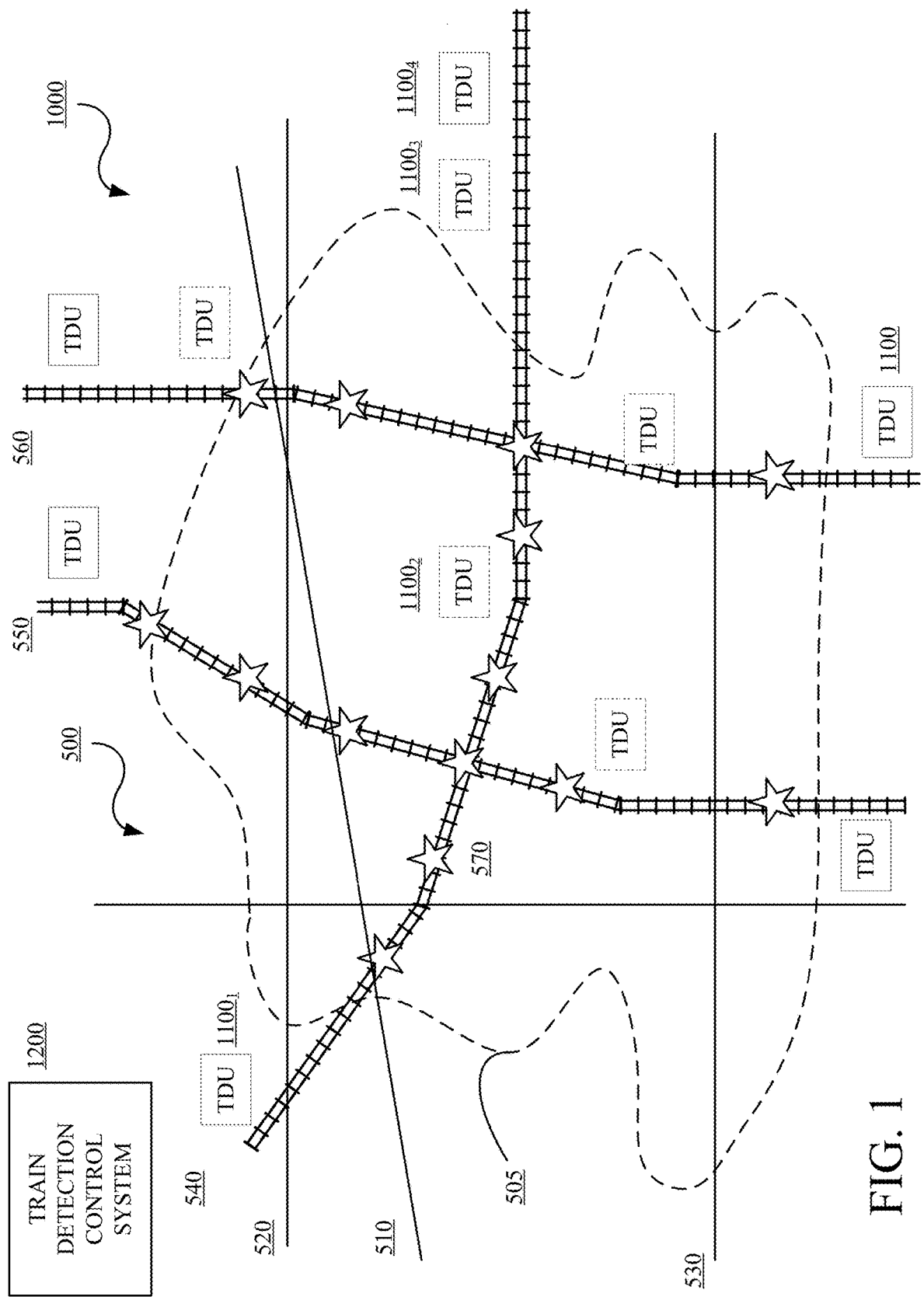
FIG. 1 is a diagram of an example train detection system deployed in an environment in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for real-time detection of trains. In implementations, a train detection unit is deployed which detects trains entering a municipality, determines the train speed, provide information to determine intersection arrival time estimates, and determine other train related information such as potential stops. Multiple train detection units can be deployed to provide train progress and updates and to correlate train information between different train detection units. A control system can use the train information to manage traffic, route emergency vehicles, and other such activities.

In implementations, a distributive train detection system includes edge units which detect the presence of an objection on a railroad tracks, classify the type of object including trains, maintenance vehicles, humans, animals, and the like, calculate train speed, calculate train length, and determine if the train is likely to stop for any defects/issues. The edge units communicate the information to a cloud-based control center or the like to estimate the estimates time of arrival (ETA) of the train at an intersection and the amount of time the train will block the intersection.

In implementations, an unmanned autonomous vehicle or a drone is dispatched toward the train to report real-time speed and position. In implementations, the drone is equipped with a camera to determine train length.

In implementations, an electromagnetic tracker is attached at train detection time to the train to track the speed of the train. The electromagnetic tracker includes global positioning system (GPS) to track real-time location. In implementations, the electromagnetic tracker is detached from the train when the train is leaving the municipality or the like.

FIG. 1 is a diagram of an example train detection system 1000 deployed in an environment in accordance with embodiments of this disclosure. In implementations, the environment can be a municipality 500, including but not limited to, a city, town, or the like, having a municipality border 505. The municipality 500 includes one or more streets 510, 520, and 530 which intersect with one or more railroad tracks 540, 550, and 560 which run through the municipality 500. Each of the railroad tracks 540, 550, and 560 can have one or more stops 570 (denoted as a star) in the municipality 500.

The train detection system 1000 can include train detection units (TDUs) 1100 which are deployed prior to the one or more railroad tracks 540, 550, and 560 cross the municipality border 505. For example, railroad tracks 540 includes TDUs $1100_1$, $1100_2$, $1100_3$, and $1100_4$. The TDUs 1100 are in communication with or connected to (collectively "in communication with") a train detection control system 1200. The number of TDUs deployed can depend on the train detection system 1000 deployed in the municipality, the number of railroads tracks, the number of stations, and the like.

In implementations employing an active device co-located with the train, the number of TDUs can be minimized to two TDUs, one TDU at each municipality border 505 intersection point. In implementations, the active device can be a drone, an electromagnetic device, and the like. The municipality border 505 intersection point TDUs are positioned sufficiently distant from the municipality border 505 to enable traffic management and alerts to be circulated or transmitted. Placement of TDUs at locations other than municipality border 505 intersection points can increase measurement resolution and confirmation. The train detection control system 1200 can be a cloud-based system, centralized computing system, distributive computing system, and the like. The train detection control system 1200 communicates information to appropriate entities in the municipality 500. The train detection system 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

Figure 2:
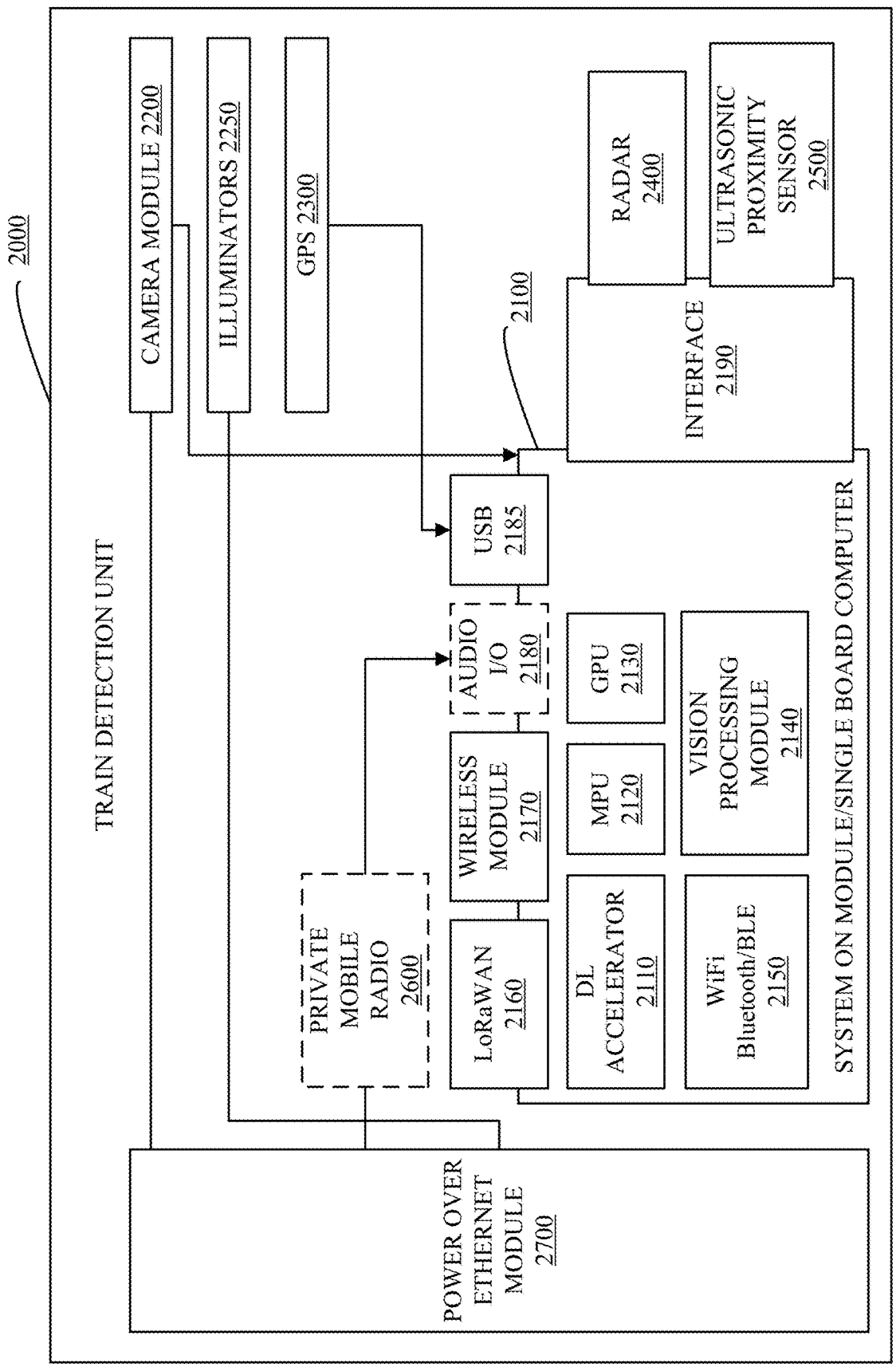
FIG. 2 is a diagram of an example train detection unit in accordance with embodiments of this disclosure.

FIG. 2 is a diagram of an example train detection unit (TDU) 2000 in accordance with embodiments of this disclosure. The TDU 2000 can include sensors, communication devices, platforms, protocols, and/or systems, and computing platforms to detect, classify, determine, and communicate train information to a train detection control system or unit such as the train detection control system 1200. The TDU 2000 can include a system on module (SOM)/single board computer (SBC) 2100 (collectively "SOM 2100"). The SOM 2100 can include computing platforms such as a deep learning accelerator 2110, a microprocessor 2120, a graphics processing unit 2130, and a vision processing module 2140, for example. The SOM 2100 can include communication platforms such as WiFi, Bluetooth, and/or Bluetooth Low power Enable (BLE) components 2150, a low-power wide-area network (LPWAN) protocol 2160 such as Long Range WAN (LoRaWAN), and a wireless module 2170, for example. The SOM 2100 can include interfacing modules such as an audio input/output (I/O) module 2180, a Universal Serial Bus (USB) port 2185, and an interface module 2190. The TDU 2000 can include sensors such as a camera module 2200, illuminators 2250, a GPS 2300, a radar module 2400, and an ultrasonic proximity sensor 2500. In implementations, the TDU 2000 can include a Private Mobile Radio or Professional Mobile Radio (PMR) 2600. The TDU 2000 can be powered using a power over Ethenet module 2700. The TDU 2000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

Figure 3:
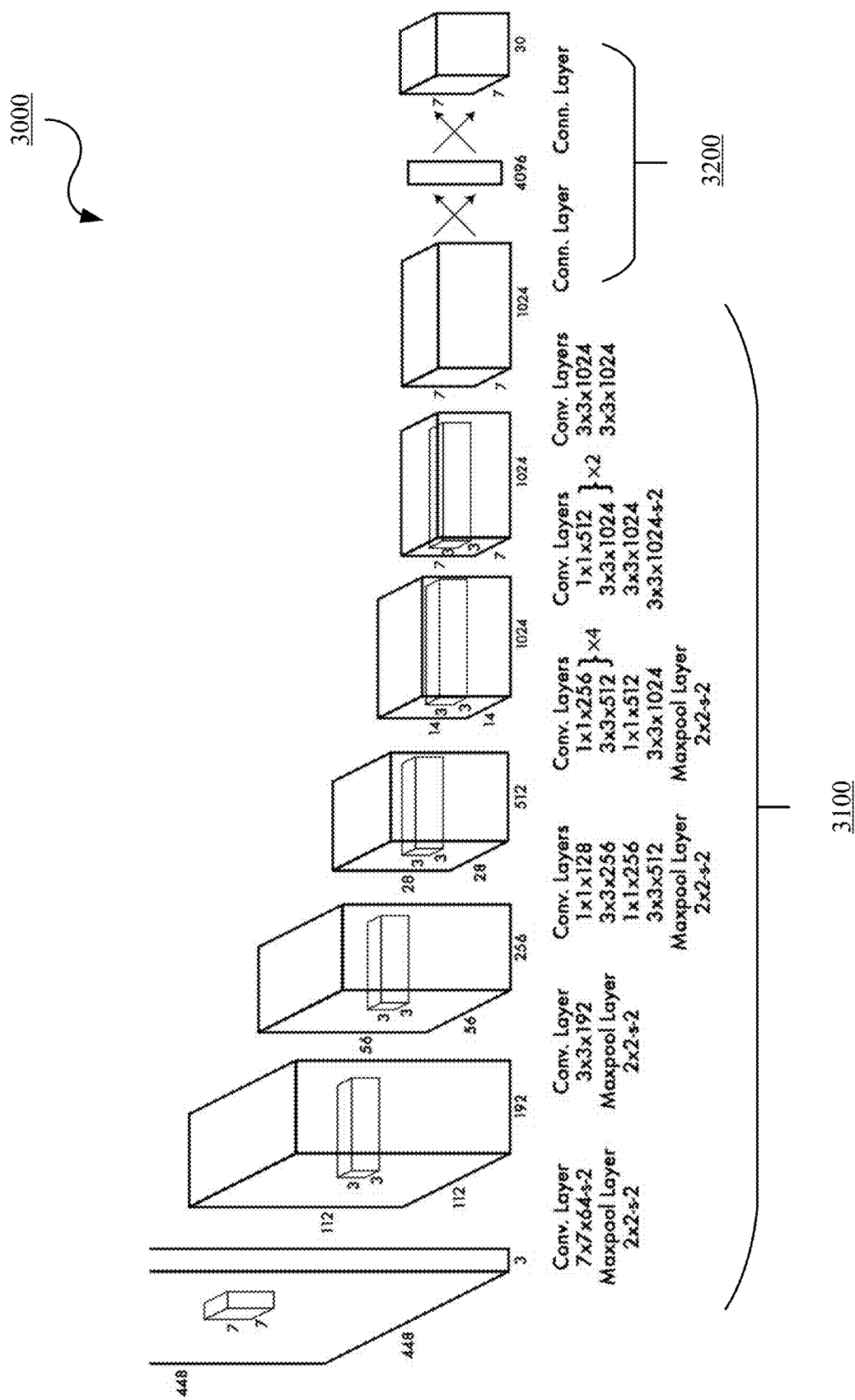
FIG. 3 is a block diagram of a convolutional neural network in accordance with embodiments of this disclosure.

In implementations, the deep learning accelerator 2110 can be a dedicated accelerator to execute a convolutional neural network (CNN) for purposes of image classification as described herein. FIG. 3 is a block diagram of a convolutional neural network (CNN) 3000 used for object classification in accordance with embodiments of this disclosure. In implementations, the CNN 3000 includes multiple convolution layers 3100 and multiple connection layers 3200 to process the image information. Each frame is sub-divided into smaller Regions of Interests (ROIs). Each boundary box or ROI contains 5 elements: (x, y, w, h) and a box confidence score. The confidence score reflects how likely the box contains an object (objectness) and how accurate is the boundary box. The bounding box width w and height h is normalized by the image width and height. The values x and y are offsets to the corresponding cell. Hence, x, y, w and h are all between 0 and 1. Each cell has 20 conditional class probabilities. The conditional class probability is the probability that the detected object belongs to a particular class (one probability per category for each cell). So, the prediction shape is (S, S, B×5+C)=(7, 7, 2×5+20)=(7, 7, 30). The CNN 3000 predicts a (7, 7, 30) tensor and CNN network (the layers 3100) to reduce the spatial dimension to 7×7 with 1024 output channels at each location. The algorithm performs a linear regression using two fully connected layers (3200) to make 7×7×2 boundary box predictions. A final prediction is made by keeping those predictions with high box confidence scores (greater than 25%).

In implementations, the microprocessor 2120 can be a computer, computing device, and/or processor along with memory. In implementations, the graphics processing unit 2130 can be used to implement CUDA cores, Tensor cores, and/or combinations thereof. In implementations, the vision processing module 2140 can be a vision accelerator or processor.

In implementations, the WiFi, Bluetooth, and/or Bluetooth Low power Enable (BLE) components 2150, the low-power wide-area network (LPWAN) protocol 2160 such as Long Range WAN (LoRaWAN), and the wireless module 2170 enable the TDU 2000 to transmit or communicate information to the train detection control system.

In implementations, the camera module 2200 can be a pan, tilt, and zoom (PTZ) camera or the like. In implementations, the GPS 2300 can provide the location of the TDU 2000. In implementations, the radar module 2400 can be a 24 GHz radar. In implementations, the ultrasonic proximity sensor 2500 can detect up to 10 meters away.

In implementations, the PMR 2600 can be tuned to a RF channel to capture train communications or defect detector announcements transmitted by trains each time it passes a train defect detector sensor or module. The captured audio samples can be transcribed using automatic speech recognition techniques to extract train information such as hot box (where a wheel bearing runs out of grease and heats up), axle count (used for determining number of train cars and any missing train cars, dragging equipment (is something dragging under or alongside), speed (does reported speed agree with your instrumentation), excessive height or width to protect bridges, tunnel entrances, and other structures with restricted clearances near the tracks, load shift, and/or other train defect information.

Figure 4:
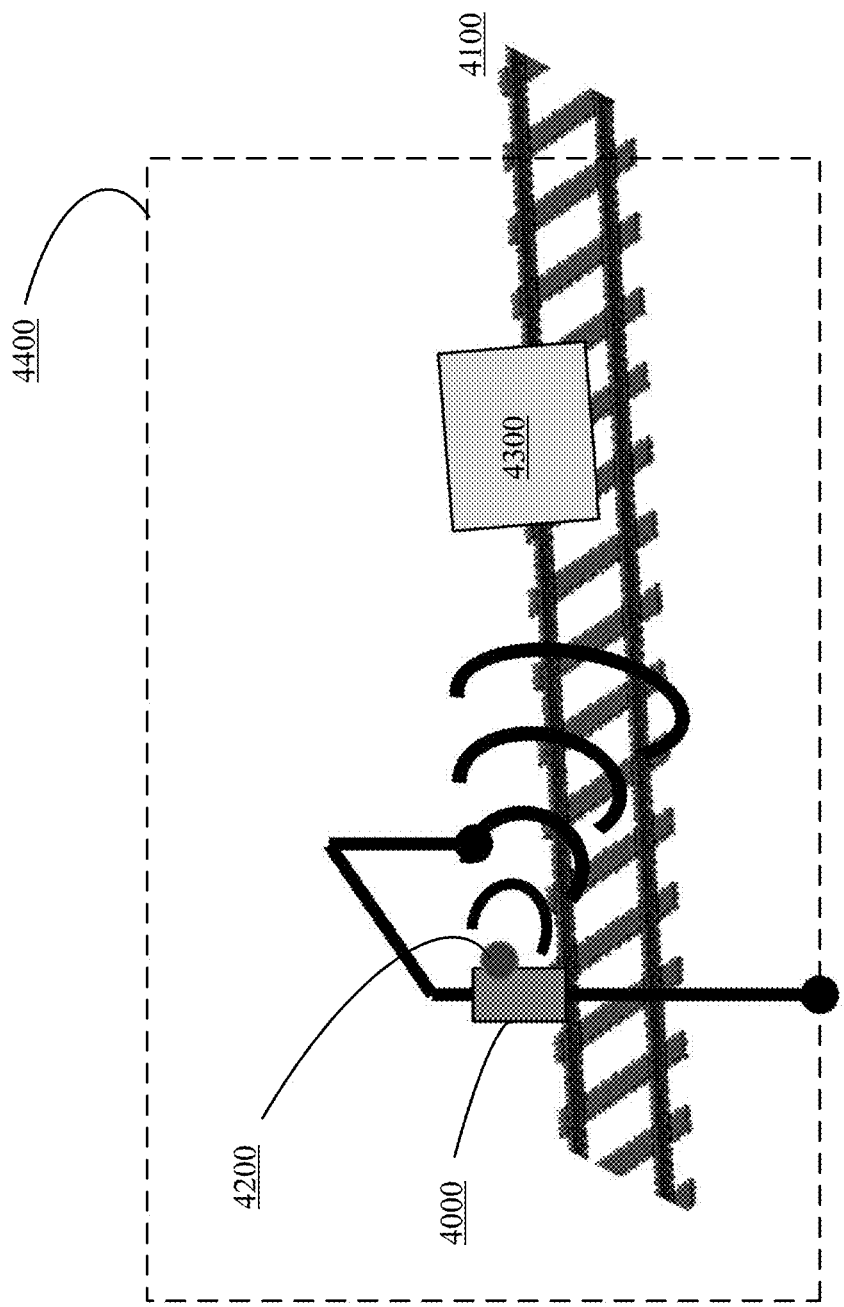
FIG. 4 is a block diagram of train detection unit proximate a railroad line in accordance with embodiments of this disclosure.

FIG. 4 is a block diagram of TDU 4000 proximate a railroad line in accordance with embodiments of this disclosure. In implementations, the TDU 4000 is positioned proximate to a railroad track 4100. The TDU 4000 illustrates an ultrasonic proximity sensor 4200. An object 4300 is positioned on the railroad track 4100 for purposes of illustration.

Referring now to FIGS. 1-4, operationally, an ultrasonic proximity sensor 4200 continuously senses for the presence of objects within a given distance from the TDU 4000 (or TDU 1100 or 2000) and notifies the TDU 4000 in real-time of the distance of the object that is being sensed. The ultrasonic proximity sensor 4200 generates waves that bounce off an object that may be present on the railroad tracks. The TDU 4000 uses a confidence zone or trusted detection zone 4400 around or proximate TDU 4000. In implementations, the confidence zone or trusted detection zone 4400 is approximately 2-3 meters. Objects detected outside the zone 4400 will be ignored. This enables the creation of a detection threshold and limit the errors on train length estimations as described herein.

Detection of the object 4300 triggers object classification. If the object is not a train, the TDU 4000 can send an alert to the train detection control system 1200 that there is an object on the railroad tracks. If the object 4300 is classified as a train, then the radar module 2400 detects the speed of the train. In implementations, reports of the speed continue as long as the train is in the trusted detection zone 4400. The TDU 4000 initiates a timer (enter timestamp) as soon as the train (object 4300) enters the trusted detection zone 4400 and the timer is shutdown (exit timestamp) as soon as the train exists the trusted detection zone 4400. The length of the train (L_train) can be determined based on the speed reported by the radar module 2400 (S_train) and the time delta or difference between entering and exiting the trusted detection zone 4400 (Delta_T_train) as:

$$L\_train = \text{Average } S\_train \times \text{Delta } T\_train \quad \text{(Equation 1)}$$

The length of the train and speed of the train can be included in a TDU report.

In implementations, the TDU 4000 can enable the PMR 2600 to capture audio transmissions from the train as described herein. Extracted information from the captured audio information can be appended or added to the TDU report.

The TDU 4000 can send two types of reports: 1) event driven reports and 2) periodic status reports. The event driven reports can include, but is not limited to, TDU identification number, object type, confidence level from classification, average speed, length, TDU position (latitude, longitude, and the like), report timestamp, and if available, defect detector information. The periodic status reports can include, but is not limited to, TDU identification number, report timestamp, previous report timestamp, TDU position (latitude, longitude, and the like), configuration information including restarts/reboots and the like, running time (up-time), computing platform usage time including processor usage time, TDU and component temperatures, memory usage, and the like.

Figure 5:
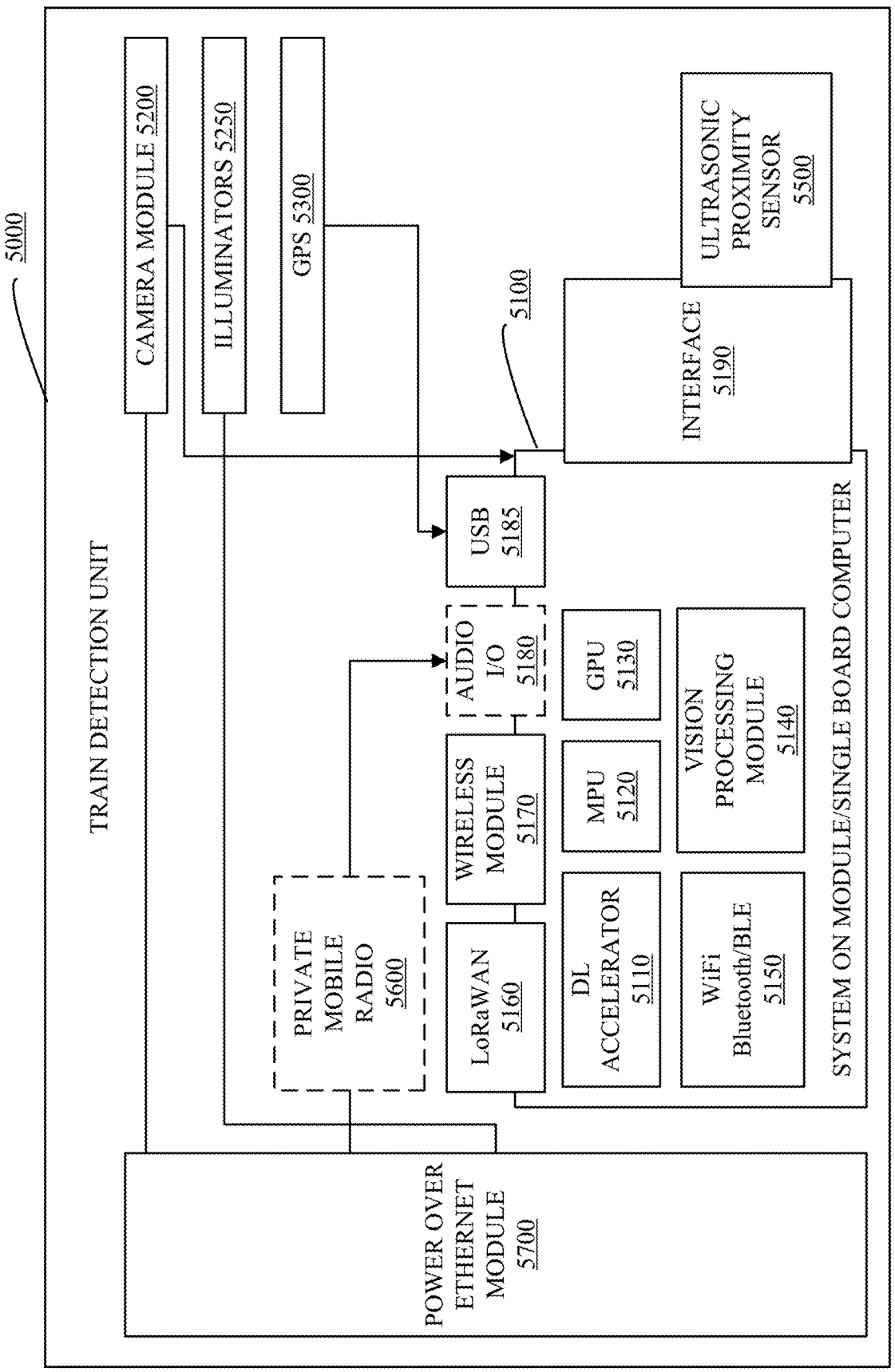
FIG. 5 is a diagram of an example train detection unit in accordance with embodiments of this disclosure.

FIG. 5 is a diagram of an example TDU 5000 in accordance with embodiments of this disclosure. The TDU 5000 can include sensors, communication devices, platforms, protocols, and/or systems, and computing platforms to detect, classify, determine, and communicate train information to a train detection control system or unit such as the train detection control system 1200. The TDU 5000 can include a system on module (SOM)/single board computer (SBC) 5100 (collectively "SOM 5100"). The SOM 5100 can include computing platforms such as a deep learning accelerator 5110, a microprocessor 5120, a graphics processing unit 5130, and a vision processing module 5140, for example. The SOM 5100 can include communication platforms such as WiFi, Bluetooth, and/or Bluetooth Low power Enable (BLE) components 5150, a low-power wide-area network (LPWAN) protocol 5160 such as Long Range WAN (LoRaWAN), and a wireless module 5170, for example. The SOM 5100 can include interfacing modules such as an audio input/output (I/O) module 5180, a Universal Serial Bus (USB) port 5185, and an interface module 5190. The TDU 5000 can include sensors such as a camera module 5200, illuminators 5250, a GPS 5300, and an ultrasonic proximity sensor 5500. In implementations, the TDU 5000 can include a Private Mobile Radio or Professional Mobile Radio (PMR) 5600. The TDU 5000 can be powered using a power over Ethernet module 5700. The TDU 5000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

In implementations, the deep learning accelerator 5110 can be a dedicated accelerator to execute a convolutional neural network (CNN) for purposes of image classification as described herein and described for example with respect to FIG. 3.

In implementations, the microprocessor 5120 can be a computer, computing device, and/or processor along with memory. In implementations, the graphics processing unit 5130 can be used to implement CUDA cores, Tensor cores, and/or combinations thereof. In implementations, the vision processing module 5140 can be a vision accelerator or processor.

In implementations, the WiFi, Bluetooth, and/or Bluetooth Low power Enable (BLE) components 5150, the low-power wide-area network (LPWAN) protocol 5160 such as Long Range WAN (LoRaWAN), and the wireless module 5170 enable the TDU 5000 to transmit or communicate information to the train detection control system.

In implementations, the camera module 5200 can be a pan, tilt, and zoom (PTZ) camera or the like. In implementations, the GPS 5300 can provide the location of the TDU 5000. In implementations, the ultrasonic proximity sensor 5500 can detect up to 10 meters away.

In implementations, the PMR 5600 can be tuned to a RF channel to capture train communications or defect detector announcements transmitted by trains each time it passes a train defect detector sensor or module. The captured audio samples can be transcribed using automatic speech recognition techniques to extract train information such as hot box (where a wheel bearing runs out of grease and heats up), axle count (used for determining number of train cars and any missing train cars, dragging equipment (is something dragging under or alongside), speed (does reported speed agree with your instrumentation), excessive height or width to protect bridges, tunnel entrances, and other structures with restricted clearances near the tracks, load shift, and/or other train defect information.

Figure 6:
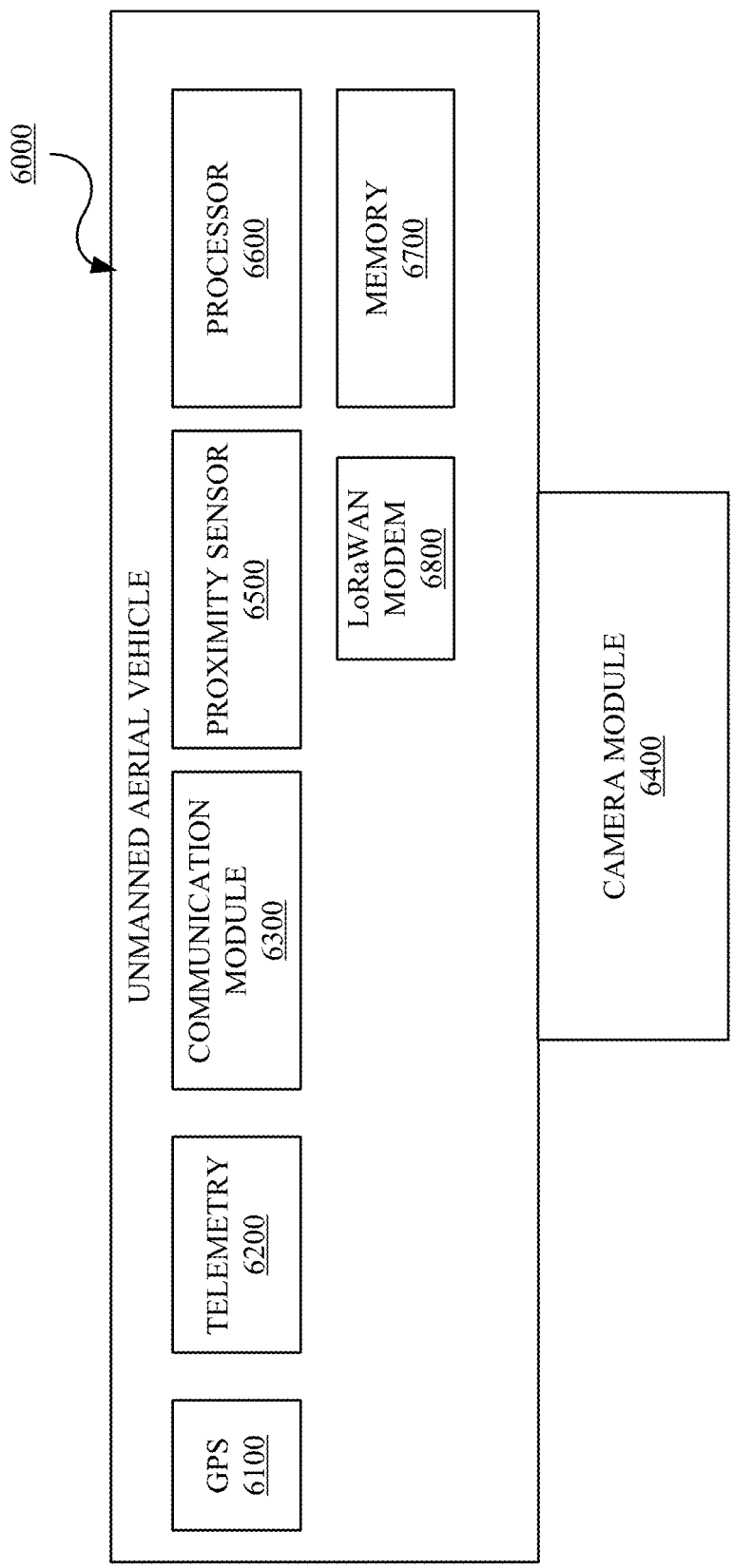
FIG. 6 is a diagram of an example unmanned aerial vehicle in accordance with embodiments of this disclosure.

FIG. 6 is a diagram of an example unmanned aerial vehicle or drone 6000 in accordance with embodiments of this disclosure. The TDU 5000 works together with the drone 6000 to obtain the train information as described herein. The drone 600 can include a GPS sensor 6100, a telemetry module 6200, a communication module 6300, a camera module 6400, a proximity sensor 6500, a processor 6600, a memory 6700, and a low-power wide-area network (LPWAN) protocol modem 6800 such as a Long Range WAN (LoRaWAN). The drone 6000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

In implementations, the camera module 6400 can be a pan, tilt, and zoom (PTZ) camera or the like. In implementations, the proximity sensor 6500 can detect up to 10 meters away.

Referring now to FIGS. 1 and 3-6, operationally, an ultrasonic proximity sensor 5500 continuously senses for the presence of objects within a given distance from the TDU 5000 (or TDU 1100) and notifies the TDU 5000 in real-time of the distance of the object that is being sensed. The ultrasonic proximity sensor 5500 generates waves that bounce off an object that may be present on the railroad tracks. The TDU 5000 uses a confidence zone or trusted detection zone (as shown in FIG. 4) around or proximate TDU 5000. In implementations, the confidence zone or trusted detection zone is approximately 2-3 meters. Objects detected outside the zone will be ignored. This enables the creation of a detection threshold and limit the errors on train length estimations as described herein.

Detection of an object triggers object classification. If the object is not a train, the TDU 5000 can send an alert to the train detection control system 1200 that there is an object on the railroad tracks. If the object is classified as a train, the TDU 5000 communicates with a drone fleet dispatch center to dispatch a drone (such as drone 6000) to a location close to the requesting TDU 5000. For example, a message to the drone fleet dispatch center can include the location of the TDU 5000 in terms of GPU data. The drone 6000 can fly to the location of the TDU 5000. Initially, the drone 6000 can hover over the train (inside the detection zone) and estimate using computer vision algorithms the length of the train. After determining the length, the drone 6000 can attempt to identify a safe landing zone on the train. A train landing can enable the drone 6000 to shut down its propellers and motors and save power. If no landing is possible, the drone 6000 can hover over the train while remaining inside the detection zone.

Once the drone 6000 has landed or maintains a hovering position, the drone 6000 can start sending the drone 6000 GPS location and instantaneous speed to the train detection control center. In implementations, the rate of updates or periodicity can be 5 seconds. The train detection control center can estimate the ETA of the train to different intersections through the municipality using the instantaneous speed and GPS coordinates. For a given municipality, drones can be programmed with a municipality border or limits. The drones can disengage from the train (if landed) and return to the drone fleet dispatch center once the train crosses the municipality border or limits. In implementations, the returning drone can undergo maintenance and the like.

In implementations, the TDU 5000 can enable the PMR 5600 to capture audio transmissions from the train as described herein. Extracted information from the captured audio information can be sent to the train detection control center. The TDU 5000 can send event driven reports and/or periodic status reports as described and as appropriate or applicable.

Figure 7:
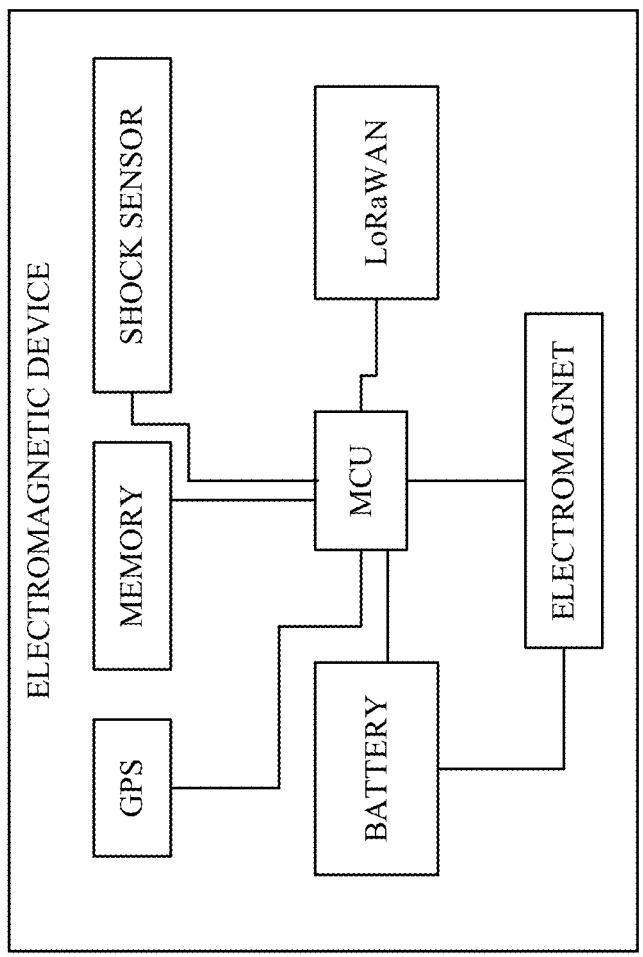
FIG. 7 is a diagram of an example electromagnetic device in accordance with embodiments of this disclosure.

FIG. 7 is a diagram of an example electromagnetic device 7000 in accordance with embodiments of this disclosure. The electromagnetic device 7000 operates with the TDU 2000 of FIG. 2 or the TDU 1100 of FIG. 1, for example. The electromagnetic device 7000 can include a GPS module 7100, memory 7200, a shock sensor 7300, a battery 7400, a low-power wide-area network (LPWAN) protocol modem 7500 such as a Long Range WAN (LoRaWAN) 7500, an electromagnet 7600, and a microprocessor 7700. In implementations, the electromagnetic device 7000 can have approximately a 3 inches×2 inches×1 inch footprint.

In implementations, the shock sensor 7300 can determine when the electromagnetic device 7000 has struck the train. In implementations, the microprocessor 7700 can be a computer, computing device, and/or processor along with memory.

Referring now to FIGS. 1-4 and 7, operationally, an ultrasonic proximity sensor 4200 continuously senses for the presence of objects within a given distance from the TDU 4000 and notifies the TDU 4000 in real-time of the distance of the object that is being sensed. The ultrasonic sensor 4200 generates waves that bounce off an object that may be present on the railroad tracks. The TDU 4000 uses a confidence zone or trusted detection zone 4400 around or proximate TDU 4000. In implementations, the confidence zone or trusted detection zone 4400 is approximately 2-3 meters. Objects detected outside the zone 4400 will be ignored. This enables the creation of a detection threshold and limit the errors on train length estimations as described herein.

Detection of the object 4300 triggers object classification. If the object is not a train, the TDU 4000 can send an alert to the train detection control system 1200 that there is an object on the railroad tracks. If the object 4300 is classified as a train, then the radar module 2400 detects the speed of the train. Entry and exit timestamps are obtained. The length of the train can be determined as shown in Equation 1.

In addition, the TDU 4000 deploys an electromagnetic device such as electromagnetic device 7000 onto the train. The electromagnetic device 7000 is enabled when the shock sensor 7300 senses impact onto the train. The electromagnetic device 7000 sends, via the GPS module 7100, GPS location coordinates of the electromagnetic device 7000 and the instantaneous speed to the train detection control center. In implementations, the rate of updates or periodicity can be 5 seconds. The train detection control center can estimate the ETA of the train to different intersections through the municipality using the instantaneous speed and GPS coordinates and the train length information. For a given municipality, electromagnetic devices can be programmed with a municipality border or limits. The electromagnetic devices can disengage from the train once the train crosses the municipality border or limits. In implementations, the municipality can collect the electromagnetic devices and recharge them accordingly.

In implementations, the TDU 4000 can enable the PMR 2600 to capture audio transmissions from the train as described herein. Extracted information from the captured audio information can be appended or added to the TDU report. The TDU 5000 can send event driven reports and/or periodic status reports as described and as appropriate or applicable.

Figure 8:
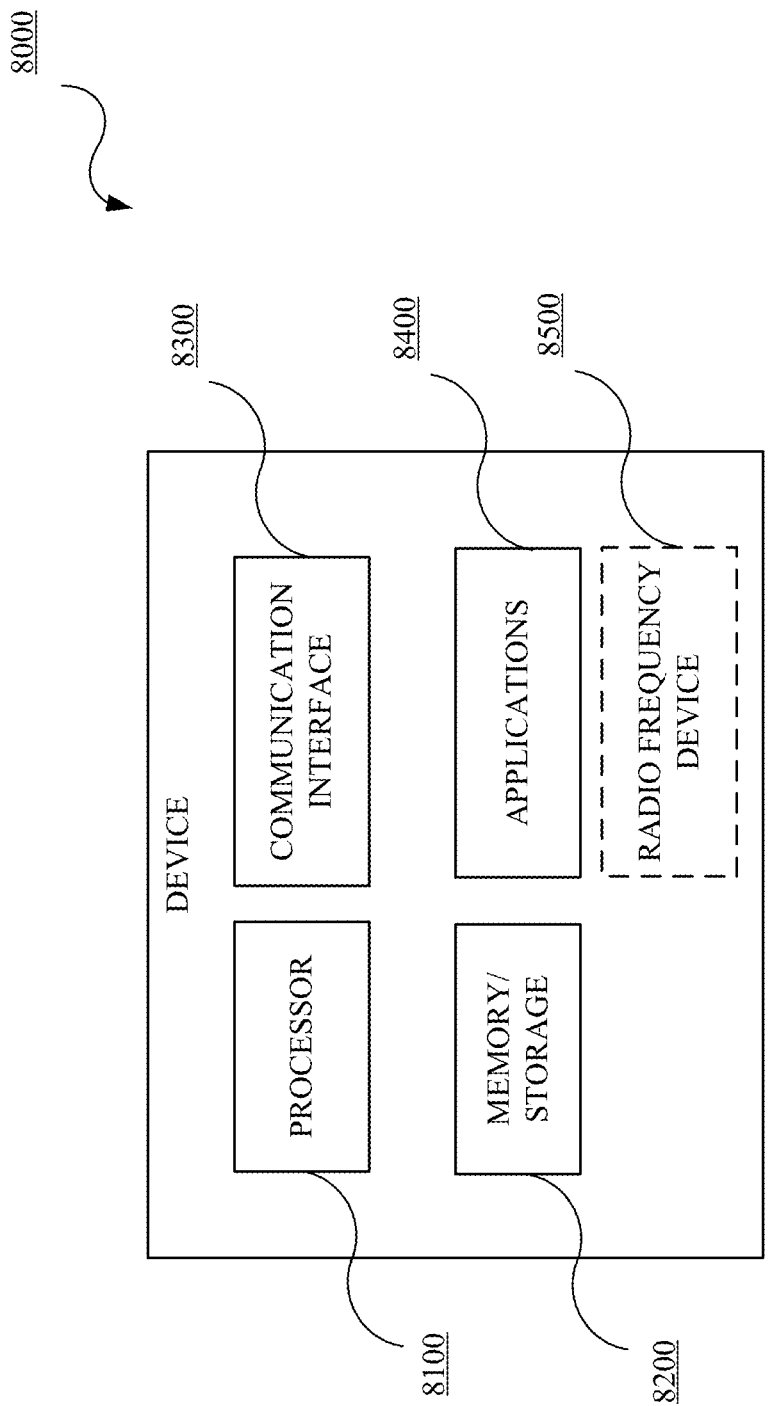
FIG. 8 is a diagram of an example device in accordance with embodiments of this disclosure.

FIG. 8 is a block diagram of an example of a device 8000 in accordance with embodiments of this disclosure. The device 8000 can include, but is not limited to, a processor 8100, a memory/storage 8200, a communication interface 8300, and applications 8400. The device 8000 can include or implement, for example, the TDUs 1100, the train detection control center 1200, the TDU 2000, the CNN 3000, the TDU 4000, the TDU 5000, the drone 6000, and the electromagnetic device 7000. In an implementation, the memory/storage 3200 may store the messages, the train speed, TDU reports, train length, timestamps and the like. The applicable or appropriate techniques or methods as described herein may be stored in the memory/storage 8200 and executed by the processor 8100 in cooperation with the memory/storage 8200, the communications interface 8300, and the applications 8400, as applicable and appropriate. The device 8000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 9:
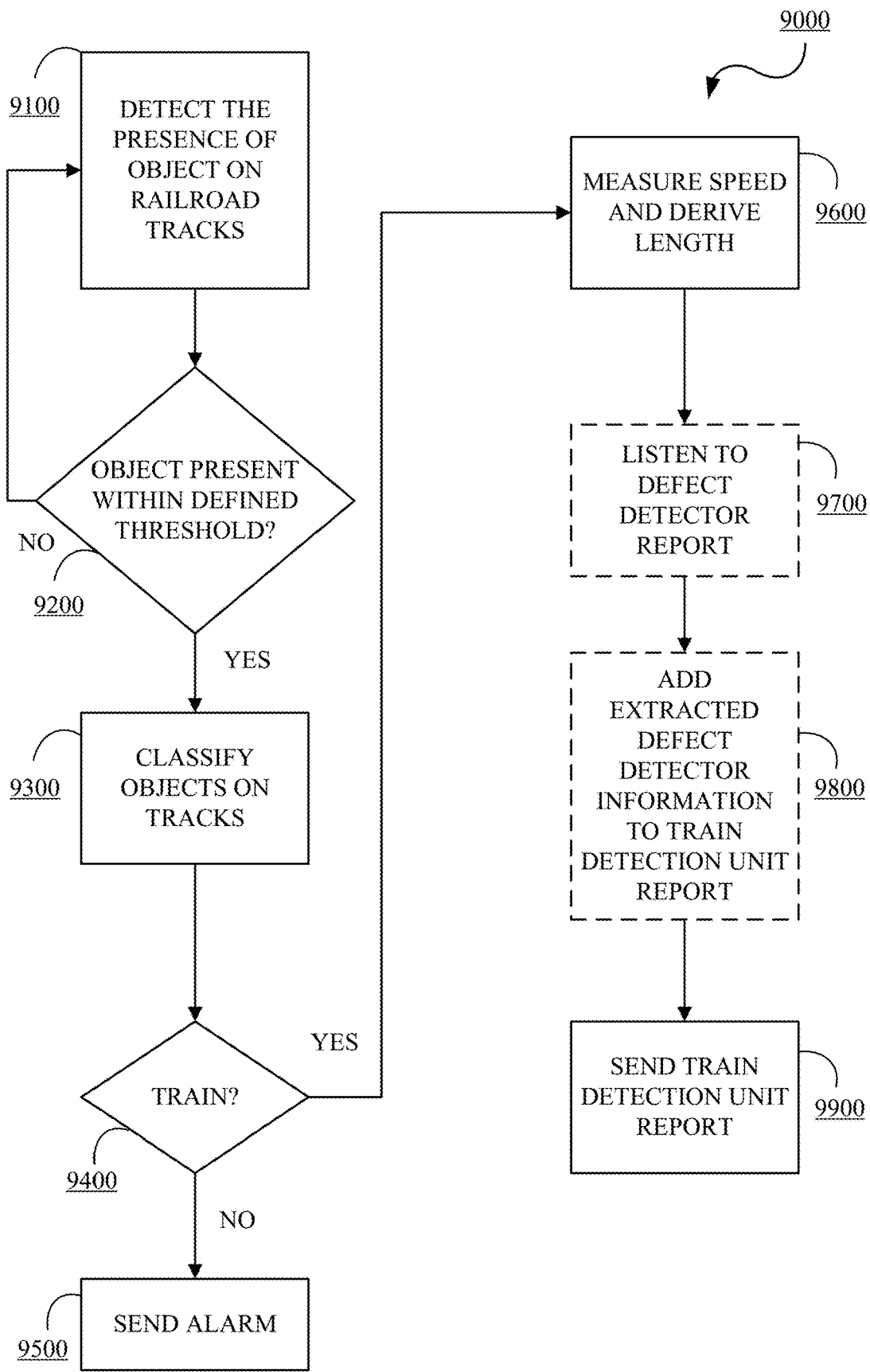
FIG. 9 is a flowchart of an example method train detection in accordance with embodiments of this disclosure.

FIG. 9 is a flowchart of an example method 9000 for real-time detection and reporting of trains in accordance with embodiments of this disclosure. The method 9000 includes: detecting 9100 presence of an object railroad tracks; determining 9200 whether object is present within defined threshold; classifying 9300 detected object if within the defined threshold; checking 9400 whether detected object is train; sending 9500 an alarm when not a train; measuring 9600 speed and deriving length when train;

listening 9700 to defect detector when available; adding 9800 extracted defect detector to train detection unit report; and sending 9900 the train detection unit report. For example, the method 9000 may be implemented, as applicable and appropriate, by the TDUs 1100, the train detection control center 1200, the TDU 2000, the CNN 3000, the TDU 4000, the TDU 5000, the drone 6000, and the electromagnetic device 7000, the device 8000, the processor 8100, the memory/storage 8200, the communication interface 8300, and the applications 8400, as appropriate and applicable.

The method 9000 includes detecting 9100 the presence of an object railroad tracks. TDUs can be deployed at railroad track or line and municipal boundary intersections a defined distance outside the municipality. Other TDUs can be deployed inside the municipality based on station stops, intersection points, and like criteria. The TDUs can use a proximity sensor to determine if an object is on the railroad track. In implementations, the proximity sensor is an ultrasonic proximity sensor. In implementations, the proximity sensor can sense at least 10 meters away from the TDU.

The method 9000 includes determining 9200 whether object is present within defined threshold. If an object is detected, the TDU can determine if the object is within a detection zone. In implementations, the detection zone is between 2-5 meters.

The method 9000 includes classifying 9300 detected object if within the defined threshold. A camera in the TDU can take an image of the detected object. Vision processing and machine learning can be applied to the image to classify the object.

The method 9000 includes checking 9400 whether detected object is train.

The method 9000 includes sending 9500 an alarm when not a train. The TDU can send an alarm or alert message to a train detection control system in the event the object is not a train but a car, animal, person, or the like. The train detection control system can inform the municipality or other entities.

The method 9000 includes measuring 9600 speed and deriving length when the detected object is a train. In the event the detected object is a train, a radar module can determine a speed of the train and the TDU can obtain timestamps when the train enters and exits the detection zone. The TDU can determine a length of the train based on the speed and the time difference between two timestamps. A TDU report can be generated including the length, speed, time stamp of report, TDU identification number, and other like information.

The method 9000 includes listening 9700 to defect detector when available. In implementations, a PMR can be tuned to capture defect detector audio streams from a defect detector on the train.

The method 9000 includes adding 9800 extracted defect detector to train detection unit report. The TDU can use automatic speech recognition techniques to determine a content of the captured defect detector audio streams. Information regarding issues or problems with the train can be present in the captured defect detector audio streams. The extracted information is added or appended to the TDU report.

The method 9000 includes sending 9900 the train detection unit report. The TDU can send the train detection report to the train detection control system. The train detection control system can determine ETAs of the train at one or more municipality intersections, how long the train will be at each intersection, and the like. The train detection control system can send or inform the municipality or other entities.

The train detection control system can receive multiple TDU reports from the TDUs deployed along the railroad track to confirm previous estimates and to check train progress.

Figure 10:
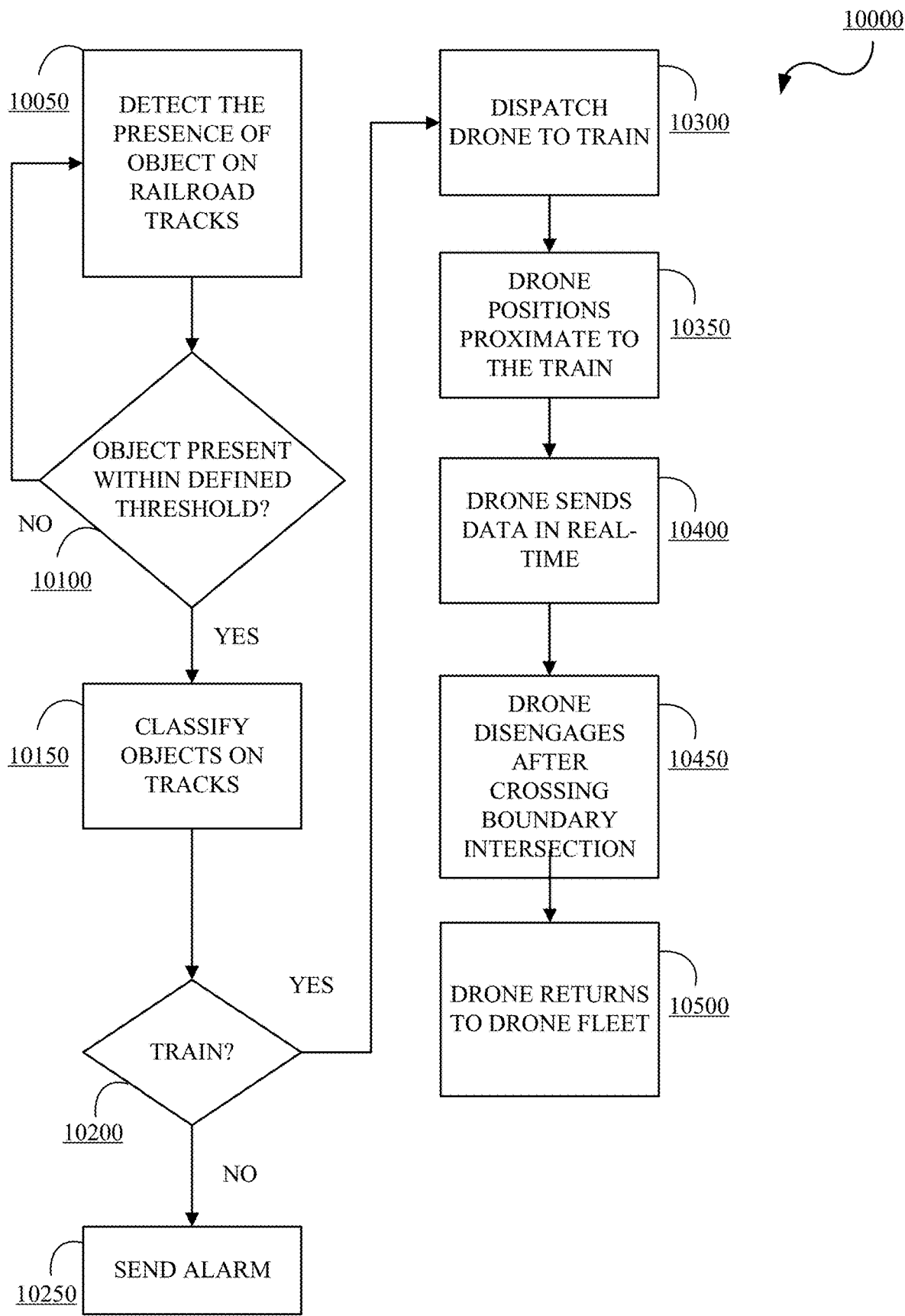
FIG. 10 is a flowchart of an example method train detection in accordance with embodiments of this disclosure.

FIG. 10 is a flowchart of an example method 10000 for real-time detection and reporting of trains in accordance with embodiments of this disclosure. The method 10000 includes: detecting 10050 presence of an object railroad tracks; determining 10100 whether object is present within defined threshold; classifying 10150 detected object if within the defined threshold; checking 10200 whether detected object is train; sending 10250 an alarm when not a train; dispatching 10300 a drone to the train; positioning 10350 proximate to the train; sending 10400 real-time data by the drone; disengaging 10450 drone after crossing boundary intersection; and returning 10500 drone to drone fleet. For example, the method 10000 may be implemented, as applicable and appropriate, by the TDUs 1100, the train detection control center 1200, the TDU 2000, the CNN 3000, the TDU 4000, the TDU 5000, the drone 6000, and the electromagnetic device 7000, the device 8000, the processor 8100, the memory/storage 8200, the communication interface 8300, and the applications 8400, as appropriate and applicable.

The method 10000 includes detecting 10050 presence of an object on railroad tracks. TDUs can be deployed at railroad track or line and municipal boundary intersections a defined distance outside the municipality. The TDUs can use a proximity sensor to determine if an object is on the railroad track. In implementations, the proximity sensor is an ultrasonic proximity sensor. In implementations, the proximity sensor can sense at least 10 meters away from the TDU.

The method 10000 includes determining 10100 whether object is present within defined threshold. If an object is detected, the TDU can determine if the object is within a detection zone. In implementations, the detection zone is between 2-5 meters.

The method 10000 includes classifying 10150 detected object if within the defined threshold. A camera in the TDU can take an image of the detected object. Vision processing and machine learning can be applied to the image to classify the object.

The method 10000 includes checking 10200 whether detected object is train.

The method 10000 includes sending 10250 an alarm when not a train. The TDU can send an alarm or alert message to a train detection control system in the event the object is not a train but a car, animal, person, or the like. The train detection control system can inform the municipality or other entities.

The method 10000 includes dispatching 10300 a drone to the train. In the event the detected object is a train, the TDU can send a message to a drone dispatch center, the train detection control system, or the like to dispatch a drone to the train. In implementations, the message can include a location, TDU identification, or the like to direct the drone.

The method 10000 includes positioning 10350 proximate to the train. In implementations, the drone can initially hover over the train to take an image of the train using an on-board camera so as to determine a train length. The drone can then determine a place to land using the camera and a proximity sensor. In implementations, the drone can remain hovering relative to a position on the train if a place to land is not found.

The method 10000 includes sending 10400 real-time data by the drone. The drone can send the train length, speed measurements, and location coordinates to the train detection control system, the TDU, or both using a telemetry module, GPS sensor, and communications modules. In the event the information is sent to the TDU, the TDU generates a TDU report to send to the train detection control system. In implementations, a PMR can be tuned to capture defect detector audio streams from a defect detector on the train. The TDU can use automatic speech recognition techniques to determine a content of the captured defect detector audio streams. Information regarding issues or problems with the train can be present in the captured defect detector audio streams. The extracted information is added or appended to the TDU report. The TDU can send the train detection report to the train detection control system. The train detection control system can determine ETAs of the train at one or more municipality intersections, how long the train will be at each intersection, and the like. The train detection control system can send or inform the municipality or other entities. The train detection control system can receive multiple reports from the drone or via the TDU to confirm previous estimates and to check train progress.

The method 10000 includes disengaging 10450 drone after crossing boundary intersection. The drone can disengage from the train, stop hovering, stop tracking, and the like when the train crosses the boundary intersection.

The method 10000 includes returning 10500 drone to drone fleet. The drone can return to the drone fleet.

Figure 11:
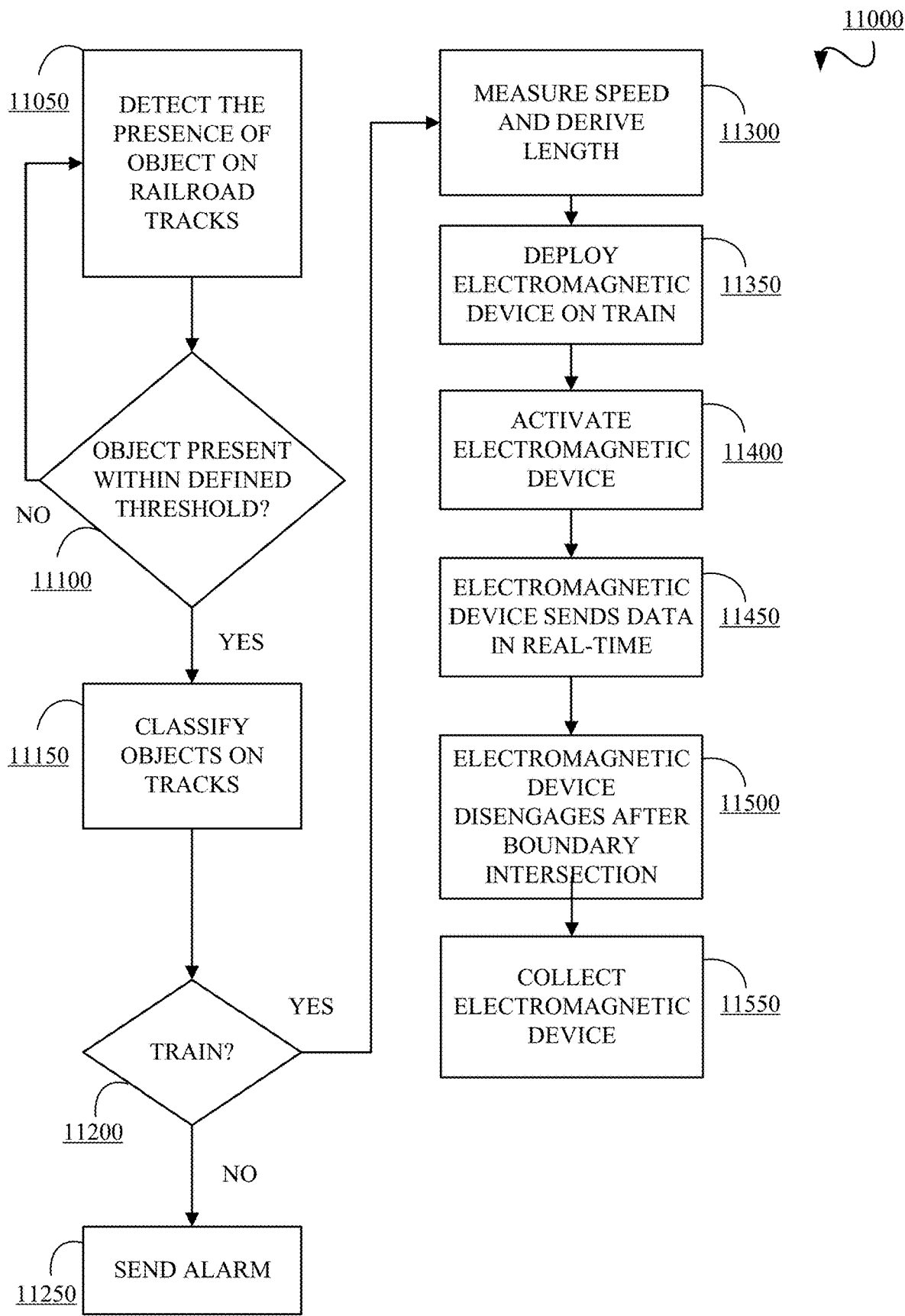
FIG. 11 is a flowchart of an example method train detection in accordance with embodiments of this disclosure.

FIG. 11 is a flowchart of an example method 11000 for real-time detection and reporting of trains in accordance with embodiments of this disclosure. The method 11000 includes: detecting 11050 presence of an object railroad tracks; determining 11100 whether object is present within defined threshold; classifying 11150 detected object if within the defined threshold; checking 11200 whether detected object is train; sending 11250 an alarm when not a train; measuring 11300 speed and deriving length when the detected object is a train; deploying 11350 an electromagnetic device on the train; activating 11400 the electromagnetic device; sending 11450 real-time data by the electromagnetic device; disengaging 11500 electromagnetic device after crossing boundary intersection; and collecting 11550 electromagnetic device. For example, the method 11000 may be implemented, as applicable and appropriate, by the TDUs 1100, the train detection control center 1200, the TDU 2000, the CNN 3000, the TDU 4000, the TDU 5000, the drone 6000, and the electromagnetic device 7000, the device 8000, the processor 8100, the memory/storage 8200, the communication interface 8300, and the applications 8400, as appropriate and applicable.

The method 11000 includes detecting 11050 presence of an object on railroad tracks. TDUs can be deployed at railroad track or line and municipal boundary intersections a defined distance outside the municipality. The TDUs can use a proximity sensor to determine if an object is on the railroad track. In implementations, the proximity sensor is an ultrasonic proximity sensor. In implementations, the proximity sensor can sense at least 10 meters away from the TDU.

The method 11000 includes determining 11100 whether object is present within defined threshold. If an object is detected, the TDU can determine if the object is within a detection zone. In implementations, the detection zone is between 2-5 meters.

The method 11000 includes classifying 11150 detected object if within the defined threshold. A camera in the TDU can take an image of the detected object. Vision processing and machine learning can be applied to the image to classify the object.

The method 11000 includes checking 11200 whether detected object is train.

The method 11000 includes sending 11250 an alarm when not a train. The TDU can send an alarm or alert message to a train detection control system in the event the object is not a train but a car, animal, person, or the like. The train detection control system can inform the municipality or other entities.

The method 11000 includes measuring 11300 speed and deriving length when the detected object is a train. In the event the detected object is a train, a radar module can determine a speed of the train and the TDU can obtain timestamps when the train enters and exits the detection zone. The TDU can determine a length of the train based on the speed and the time difference between two timestamps. A TDU report can be generated including the length, speed, time stamp of report, TDU identification number, and other like information.

The method 11000 includes deploying 11350 an electromagnetic device on the train. The TDU can deploy an electromagnetic device toward the train to collect and send train information.

The method 11000 includes activating 11400 the electromagnetic device. The electromagnetic device can be activated when a shock sensor determines the electromagnetic device is attached to the train.

The method 11000 includes sending 11450 real-time data by the electromagnetic device. The electromagnetic device can send speed measurements and location coordinates to the train detection control system, the TDU, or both. In the event the information is sent to the TDU, the TDU generates a TDU report to send to the train detection control system. In implementations, a PMR can be tuned to capture defect detector audio streams from a defect detector on the train. The TDU can use automatic speech recognition techniques to determine a content of the captured defect detector audio streams. Information regarding issues or problems with the train can be present in the captured defect detector audio streams. The extracted information is added or appended to the TDU report. The TDU can send the train detection report to the train detection control system. The train detection control system can determine ETAs of the train at one or more municipality intersections, how long the train will be at each intersection, and the like. The train detection control system can send or inform the municipality or other entities. The train detection control system can receive multiple reports from the electromagnetic device or via the TDU to confirm previous estimates and to check train progress.

The method 11000 includes disengaging 11500 electromagnetic device after crossing boundary intersection. The electromagnetic device can release itself from the train and the like when the train crosses the boundary intersection.

The method 11000 includes collecting 11550 electromagnetic device. The municipality or like entities can collect the electromagnetic devices for reuse.

In general, a train detection system includes at least two train detection units for each railroad track intersecting a municipality boundary. Each train detection unit including a proximity sensor configured to sense a presence of an object on the railroad track, a camera configured to capture an image of a detected object when the object is within a detection zone, a radar configured to measure speed when the detected object in the image is classified as a train, and a processor connected to the proximity sensor, the camera, and the radar. The processor configured to classify the detected object in the image, generate a timestamp corresponding to when the train entered the detection zone and when the train exited the detection zone, and determine a train length from the speed and time delta between entrance timestamp and exit timestamp. A train detection controller configured to receive at least the train length and a train detection unit identification from one of the at least two train detection units, and determine estimated time of arrivals for the train at different locations in a municipality.

In implementations, processor and the communications device is configured to transmit an alert when the detected object in the image is classified as other than the train. In implementations, each train detection unit further including a private mobile radio connected to the processor, the private mobile radio configured to tune to broadcasts from a defect detector, the processor configured to apply automatic speech recognition to extract train information and the communications device configured to send the train information along with the at least the train length and the train detection unit identification to the train detection controller. In implementations, the train detection system further including electromagnetic devices configured to attach to a detected train and send real-time speed and location measurements. In implementations, the processor configured to deploy an electromagnetic device toward the train, wherein the electromagnetic device is activated upon attachment to the train. In implementations, the electromagnetic device sends updated speed and location measurements at a periodic rate. In implementations, the train detection controller tracks progress of the train and updates the estimated time of arrivals for the train at the different locations in the municipality. In implementations, the train detection system further including additional train detection units deployed along the railroad track within the municipality border, each additional train detection unit sending at least train length and a train detection unit identification to the train detection controller to track progress of the train and update the estimated time of arrivals for the train at the different locations in the municipality.

In general, a train detection system including drones and at least two train detection units for each railroad track intersecting a municipality boundary. Each train detection unit including a proximity sensor configured to sense a presence of an object on the railroad track, a camera configured to capture an image of a detected object when the object is within a detection zone, a processor connected to the proximity sensor, and the camera. The processor configured to classify the detected object in the image and deploy a drone to a location of the train. The drone configured to capture an image of the train to determine a train length and determine a position on or hover proximate to the train. A train detection controller configured to receive at least the train length, speed measurements, and location coordinates from the drone and determine estimated time of arrivals for the train at different locations in a municipality.

In implementations, the processor and the communications device configured to transmit an alert when the detected object in the image is classified as other than the train. In implementations, each train detection unit further including a private mobile radio connected to the processor, the private mobile radio configured to tune to broadcasts from a defect detector, the processor configured to apply automatic speech recognition to extract train information, and the communications device configured to send the train information to the train detection controller. In implementations, the drone sends updated speed and location measurements at a periodic rate. In implementations, the train detection controller tracks progress of the train and updates the estimated time of arrivals for the train at the different locations in the municipality.

In general, a train detection unit including a proximity sensor configured to sense a presence of an object on a railroad track which intersects a municipality, a camera configured to capture an image of a detected object when the object is within a detection zone, a radar configured to measure speed when the detected object in the image is classified as a train, and a processor connected to the proximity sensor, the camera, and the radar. The processor configured to classify the detected object in the image, generate a timestamp corresponding to when the train entered the detection zone and when the train exited the detection zone, and determine a train length from the speed and time delta between entrance timestamp and exit timestamp. A communications device connected to the processor, the communications device configured to transmit at least the train length and a train detection unit identification to a train detection controller to determine estimated time of arrivals for the train at different locations.

In implementations, the processor and the communications device configured to transmit an alert when the detected object in the image is classified as other than the train. In implementations, the train detection unit of claim 1 further including a private mobile radio connected to the processor, the private mobile radio configured to tune to broadcasts from a defect detector, the processor configured to apply automatic speech recognition to extract train information, and the communications device configured to send the train information along with the at least the train length and the train detection unit identification to the train detection controller. In implementations, the processor configured to deploy an electromagnetic device toward the train, which is configured to send speed and location measurements upon activation of the electromagnetic device.

In general, a method for real-time detection and reporting of trains, the method including detecting, by a train detection unit, a presence of an object on a railroad track, the railroad track intersecting boundaries of a municipality and the train detection unit deployed outside of the municipality proximate to the railroad track, determining, by the train detection unit, whether a detected object is within defined range of the train detection unit, classifying, by the train detection unit, the detected object as a train or other object, obtaining train speed and train length when the detected object is a train, and sending, to a train detection controller, at least the train length and train speed for determination of estimated time of arrivals for the train at different locations in the municipality.

In implementations, the method including listening, by the train detection unit, to a defect detector when available, extracting, by the train detection unit, defect detector information, and sending, to a train detection controller, extracted defect detector information. In implementations, the method further including deploying, by the train detection unit, a drone to a train location, receiving the train speed, the train length, and location from the drone at periodic intervals, and disengaging the drone when the train crosses a municipality boundary. In implementations, the method further including deploying, by the train detection unit, an electromagnetic device on the train, receiving the train speed and location from the electromagnetic device at periodic intervals, and releasing the electromagnetic device when the train crosses a municipality boundary.

Although some embodiments herein refer to methods, it will be appreciated by one skilled in the art that they may also be embodied as a system or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A train detection system comprising:
   at least two train detection units for each railroad track intersecting a municipality boundary, each train detection unit including:
   a proximity sensor configured to sense a presence of an object on the railroad track;
   a camera configured to capture an image of a detected object when the object is within a detection zone;
   a radar configured to measure speed when the detected object in the image is classified as a train;
   a processor connected to the proximity sensor, the camera, and the radar, the processor configured to:
   classify the detected object in the image;
   generate a timestamp corresponding to when the train entered the detection zone and when the train exited the detection zone; and determine a train length from the speed and time delta between entrance timestamp and exit timestamp; and a train detection controller configured to:
receive at least the train length and a train detection unit identification from one of the at least two train detection units; and
determine estimated time of arrivals for the train at different locations in a municipality
wherein one of the at least two train detection units indicates when the train enters the municipality by crossing a corresponding municipality boundary and another of the at least two train detection units indicates when the train exits the municipality by crossing a corresponding municipality boundary.

2. The train detection system of claim 1, the processor and a communications device configured to transmit an alert when the detected object in the image is classified as other than the train.

3. The train detection system of claim 1, each train detection unit further comprising:
a private mobile radio connected to the processor, the private mobile radio configured to tune to broadcasts from a defect detector sensor configured to detect defects associated with the train;
the processor configured to apply automatic speech recognition to extract train information; and
a communications device configured to send the train information along with the at least the train length and a train detection unit identification to the train detection controller.

4. The train detection system of claim 1, further comprising:
electromagnetic devices configured to attach to a detected train and send real-time speed and location measurements.

5. The train detection system of claim 4, the processor configured to deploy an electromagnetic device toward the train, wherein the electromagnetic device is activated upon attachment to the train and wherein the electromagnetic device is configured to detach from the train when the train crosses a municipality boundary indicating an exiting of the municipality.

6. The train detection system of claim 5, wherein the electromagnetic device sends updated speed and location measurements at a periodic rate.

7. The train detection system of claim 6, wherein the train detection controller tracks progress of the train and updates the estimated time of arrivals for the train at the different locations in the municipality.

8. The train detection system of claim 1, further comprising:
additional train detection units deployed along the railroad track within the municipality border, each additional train detection unit sending at least train length and a train detection unit identification to the train detection controller to track progress of the train and update the estimated time of arrivals for the train at the different locations in the municipality.

9. A train detection system comprising:
drones;
at least two train detection units for each railroad track intersecting a municipality boundary, wherein one of the at least two train detection units indicates entry into a municipality when an object crosses a corresponding municipality boundary and another of the at least two train detection units indicates exit from the municipality when the object crosses a corresponding municipality boundary, each train detection unit including:
a proximity sensor configured to sense a presence of the object on the railroad track;
a camera configured to capture an image of a detected object when the object is within a detection zone;
a processor connected to the proximity sensor, and the camera, the processor configured to:
classify the detected object in the image;
deploy a drone to a location of the object when the object is classified as a train; and
transmit an alert when the detected object in the image is classified as other than the train;
the drone configured to:
capture an image of the train to determine a train length; and
determine a position on or hover proximate to the train; and
a train detection controller configured to:
receive at least the train length, speed measurements, and location coordinates from the drone; and
determine estimated time of arrivals for the train at different locations in a municipality.

10. The train detection system of claim 9, each train detection unit further comprising:
a private mobile radio connected to the processor, the private mobile radio configured to tune to broadcasts from a defect detector;
the processor configured to apply automatic speech recognition to extract train information; and
a communications device configured to send the train information to the train detection controller.

11. The train detection system of claim 9, wherein the drone sends updated speed and location measurements at a periodic rate.

12. The train detection system of claim 11, wherein the train detection controller tracks progress of the train and updates the estimated time of arrivals for the train at the different locations in the municipality.

13. A train detection unit comprising:
a proximity sensor configured to sense a presence of an object on a railroad track which intersects a municipality;
a camera configured to capture an image of a detected object when the object is within a detection zone;
a radar configured to measure speed when the detected object in the image is classified as a train;
a processor connected to the proximity sensor, the camera, and the radar, the processor configured to:
classify the detected object in the image;
generate a timestamp corresponding to when the train entered the detection zone and when the train exited the detection zone; and
determine a train length from the speed and time delta between entrance timestamp and exit timestamp; and
a communications device connected to the processor, the communications device configured to transmit at least the train length and a train detection unit identification to a train detection controller to determine estimated time of arrivals for the train at different locations.

14. The train detection unit of claim 13, the processor and the communications device configured to transmit an alert when the detected object in the image is classified as other than the train.

15. The train detection unit of claim 13, further comprising:
- a private mobile radio connected to the processor, the private mobile radio configured to tune to broadcasts from a defect detector sensor configured to detect defects associated with the train;
- the processor configured to apply automatic speech recognition to extract train information; and
- the communications device configured to send the train information along with the at least the train length and the train detection unit identification to the train detection controller.

16. The train detection unit of claim 13, the processor configured to deploy an electromagnetic device toward the train, which is configured to send speed and location measurements upon activation of the electromagnetic device.

17. A method for real-time detection and reporting of trains, the method comprising:
- detecting, by a proximity sensor in a train detection unit, a presence of an object on a railroad track, the railroad track intersecting boundaries of a municipality and the train detection unit deployed outside of the municipality proximate to the railroad track;
- detecting, by another proximity sensor in another train detection unit, a presence of the object on the railroad track, wherein the train detection unit indicates when the train enters the municipality by crossing a corresponding municipality boundary and the another train detection unit indicates when the train exits the municipality by crossing a corresponding municipality boundary;
- determining, by a processor in the train detection unit and a processor in the another train detection unit, whether a detected object is within a defined range of the train detection unit and the another train detection unit, respectively;
- classifying, by the processor in the train detection unit and the processor in the another train detection unit, the detected object as a train or other object;
- transmitting, by the train detection unit and the another train detection unit, an alert when the detected object in the image is classified as other than the train;
- obtaining, by the processor in the train detection unit and the processor in the another train detection unit, train speed and train length when the detected object is a train; and
- sending, by the train detection unit and the another train detection unit to a train detection controller, at least the train length and train speed for determination of estimated time of arrivals for the train at different locations in the municipality.

18. The method of claim 17, the method comprising:
- listening, by the train detection unit, to a defect detector sensor configured to detect defects associated with the train when available;
- extracting, by the train detection unit, defect detector information; and
- sending, to a train detection controller, extracted defect detector information.

19. The method of claim 17, further comprising:
- deploying, by the train detection unit, a drone to a train location upon classification of the object as the train;
- receiving the train speed, the train length, and location from the drone at periodic intervals; and
- disengaging the drone when the train crosses a municipality boundary.

20. The method of claim 17, further comprising:
- deploying, by the train detection unit, an electromagnetic device on the train upon classification of the object as the train;
- receiving the train speed and location from the electromagnetic device at periodic intervals; and
- releasing the electromagnetic device when the train crosses a municipality boundary.

* * * * *